United States Patent
Bloms et al.

(10) Patent No.: US 7,063,055 B2
(45) Date of Patent: *Jun. 20, 2006

(54) ENGINE VALVE ACTUATION SYSTEM AND METHOD

(75) Inventors: Jason Kenneth Bloms, Peoria, IL (US); James J. Faletti, Spring Valley, IL (US); Richard Herman Holtman, Dunlap, IL (US); Scott Alan Leman, Eureka, IL (US); David Andrew Pierpont, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 24 days.

This patent is subject to a terminal disclaimer.

(21) Appl. No.: 10/969,957

(22) Filed: Oct. 22, 2004

(65) Prior Publication Data

US 2005/0051119 A1     Mar. 10, 2005

Related U.S. Application Data

(63) Continuation of application No. 10/144,065, filed on May 14, 2002, now Pat. No. 6,807,929.

(51) Int. Cl.
*F01L 9/02* (2006.01)

(52) U.S. Cl. .............. 123/90.12; 123/90.44; 123/347; 123/350

(58) Field of Classification Search .. 123/90.11–90.18, 123/320–322, 90.39, 90.44, 347, 348, 350, 123/406.12, 406.13
See application file for complete search history.

(56) References Cited

U.S. PATENT DOCUMENTS 3,250,068 A    5/1966   Vulliamy (Continued)

FOREIGN PATENT DOCUMENTS

| JP | 05106415 A2 | 4/1993 |
|---|---|---|
| JP | 2000120457 A | 4/2000 |
| JP | 2000-145484 | 5/2000 |
| JP | 2000145484 A | 5/2000 |
| WO | WO 98/02653 | 1/1998 |

OTHER PUBLICATIONS

Edwards et al., "The Potential of a Combined Miller Cycle and Internal EGR Engine for Future Heavy Duty Truck Applications," The Engineering Society for Advancing Mobility Land Sea Air and Space International, International Congress and Exposition, Feb. 23-26, 1998, pp. 1-19.

(Continued)

*Primary Examiner*—Thomas Denion
*Assistant Examiner*—Ching Chang
(74) *Attorney, Agent, or Firm*—Finnegan, Henderson, Farabow, Garrett & Dunner LLP

(57) ABSTRACT

An engine valve actuation system is provided. The system includes an engine valve moveable between a closed position and an open position. A spring is operatively connected to the engine valve to bias the engine valve towards the closed position. An actuator is operatively connected to the engine valve and is operable to selectively engage the engine valve to prevent the engine valve from returning to the closed position and to release the engine valve to allow the engine valve to return to the closed position. A sensor is configured to provide information related to the operation of the actuator. A controller is configured to transmit a signal to the actuator to engage the engine valve to prevent the engine valve from returning to the closed position and to release the engine valve to the allow the engine valve to return to the closed position. The controller is further configured to receive a signal from said sensor and to identify when the actuator fails to engage the engine valve in response to the transmitted signal or when the actuator fails to release the engine valve.

26 Claims, 5 Drawing Sheets

U.S. PATENT DOCUMENTS

| | | | |
|---|---|---|---|
| 4,227,494 A | 10/1980 | Uitvlugt | |
| 4,424,790 A | 1/1984 | Curtil | |
| 4,561,253 A | 12/1985 | Curtil | |
| 4,726,332 A | 2/1988 | Nishimura et al. | |
| 4,742,806 A | 5/1988 | Tart et al. | |
| 4,815,423 A | 3/1989 | Holmer | |
| 4,869,222 A | 9/1989 | Klassen | |
| 4,996,954 A | 3/1991 | Seki | |
| 5,042,437 A | 8/1991 | Sakuragi et al. | |
| 5,408,979 A | 4/1995 | Backlund et al. | |
| 5,445,128 A | 8/1995 | Letang et al. | |
| 5,544,626 A | 8/1996 | Diggs et al. | |
| 5,576,963 A | 11/1996 | Ribbens et al. | |
| 5,596,956 A * | 1/1997 | Ogawa et al. | 123/90.11 |
| 5,682,854 A | 11/1997 | Ozawa | |
| 5,697,333 A | 12/1997 | Church et al. | |
| 5,730,102 A | 3/1998 | Arnold et al. | |
| 5,787,855 A | 8/1998 | Mueller et al. | |
| 5,816,216 A | 10/1998 | Egashira et al. | |
| 5,908,015 A | 6/1999 | Kreuter | |
| 5,992,390 A | 11/1999 | Moyer | |
| 6,021,758 A | 2/2000 | Carey et al. | |
| 6,026,786 A | 2/2000 | Groff et al. | |
| 6,082,328 A | 7/2000 | Meistrick et al. | |
| 6,170,441 B1 | 1/2001 | Haldeman et al. | |
| 6,209,516 B1 | 4/2001 | Yamashita | |
| 6,237,551 B1 | 5/2001 | Macor et al. | |
| 6,267,107 B1 | 7/2001 | Ward | |
| 6,273,076 B1 | 8/2001 | Beck et al. | |
| 6,279,550 B1 | 8/2001 | Bryant | |
| 6,301,887 B1 | 10/2001 | Gorel et al. | |
| 6,301,889 B1 | 10/2001 | Gladden et al. | |
| 6,302,076 B1 | 10/2001 | Bredy | |
| 6,378,473 B1 * | 4/2002 | Yamaki et al. | 123/90.11 |
| 6,390,041 B1 | 5/2002 | Nakamura et al. | |
| 6,425,355 B1 * | 7/2002 | Van Der Staay | 123/90.11 |
| 6,460,337 B1 | 10/2002 | Olofsson | |
| 6,467,452 B1 | 10/2002 | Duffy et al. | |
| 6,571,765 B1 | 6/2003 | Kuboshima et al. | |
| 6,651,618 B1 | 11/2003 | Coleman et al. | |
| 6,688,280 B1 | 2/2004 | Weber et al. | |
| 2002/0179027 A1 | 12/2002 | Jankovic et al. | |

OTHER PUBLICATIONS

Obert, "Internal Combustion Engines and Air Pollution," Based on Internal Combustion Engines, Third Edition, 1973, pp. 612-614.

Challen et al., "Diesel Engine Reference Book, Section Edition," SAE International, 1999, pp. 75, 81, 84, 146, and 263-305.

Yorihiro Fukuzawa et al., "Development of High Efficiency Miller Cycle Gas Engine", Mitsubishi Heavy Industries, Ltd., Technical Review, vol. 38, No. 3, Oct. 2001, pp. 146-150.

Request for *Inter Partes* Reexamination of U.S. Patent 6,688,280, filed Sep. 17, 2004.

Request for *Inter Partes* Reexamination of U.S. Patent 6,651,618, filed Aug. 27, 2004.

"Technology-The Inside Story on the Miller-cycle Engine", http://www.mazda.com/au/corpora/209.html, Oct. 16, 2001, p. 1-6.

* cited by examiner

ENGINE VALVE ACTUATION SYSTEM AND METHOD

RELATED APPLICATIONS

This is a continuation of application Ser. No. 10/144,065, filed May 14, 2002, now U.S. Pat. No. 6,807,929 which is incorporated herein by reference.

TECHNICAL FIELD

The present invention is directed to a system and method for actuating an engine valve. More particularly, the present invention is directed to a system and method for actuating the valves in an internal combustion engine.

BACKGROUND

An internal combustion engine, such as, for example, a diesel, gasoline, or natural gas engine, typically includes a series of intake and exhaust valves. These valves may be actuated, or selectively opened and closed, to control the amount of intake and exhaust gases that flow to and from the combustion chambers of the engine. Typically, the actuation of the engine valves is timed to coincide with the reciprocating movement of a series of pistons. For example, the intake valves associated with a particular combustion chamber may be opened when the respective piston is moving through an intake stroke. The exhaust valves associated with the particular combustion chamber may be opened when the respective piston is moving through an exhaust stroke.

The combustion process of an internal combustion engine may generate undesirable emissions, such as, for example, particulates and oxides of nitrogen (NOx). These emissions are generated when a fuel, such as, for example, diesel, gasoline, or natural gas, is combusted within the combustion chambers of the engine. If no emission reduction systems are in place, the engine will exhaust these undesirable emissions to the environment.

An engine may include many different types of emission reduction systems to reduce the amount of emissions exhausted to the environment. For example, the engine may include an engine gas recirculation system and/or an after-treatment system. Unfortunately, while these emission reduction systems may effectively reduce the amount of emissions exhausted to the environment, these systems typically result in a decrease in the efficiency of the engine.

Efforts are currently being focused on improving engine efficiency to counterbalance the effect of emission reduction systems. One such approach to improving engine efficiency involves adjusting the actuation timing of the engine valves. For example, the actuation timing of the intake and exhaust valves may be modified to implement a variation on the typical diesel or Otto cycle known as the Miller cycle. In a "late intake" type Miller cycle, the intake valves of the engine are held open during a portion of the compression stroke of the piston.

The engine valves in an internal combustion engine are typically driven by a cam arrangement that is operatively connected to the crankshaft of the engine. The rotation of the crankshaft results in a corresponding rotation of a cam that drives one or more cam followers. The movement of the cam followers results in the actuation of the engine valves. The shape of the cam governs the timing and duration of the valve actuation. As described in U.S. Pat. No. 6,237,551, a "late intake" Miller cycle may be implemented in such a cam arrangement by modifying the shape of the cam to overlap the actuation of the intake valve with the start of the compression stroke of the piston.

One problem with implementing a Miller cycle in an engine is that the resulting reduced air flow and compression ratio may negatively impact the performance of the engine under certain operating conditions, such as, for example, when the engine is starting or operating under heavy loads. In these types of conditions, engine performance may be enhanced by switching the operation of the engine to a convention diesel cycle. This may be accomplished with a variable valve actuation system, such as the system described in U.S. Pat. No. 6,237,551. As described, the variable valve actuation system may include a valve that is operable to selectively enable and disable a Miller cycle.

While the selective enabling of a Miller cycle may improve the performance of an engine, the variable valve actuation system may also increase the amount of required maintenance on the engine. If, for example, a variable valve actuation system were to fail and cause an engine to continuously operate in a conventional diesel cycle, the resulting increased compression ratio in each cylinder may eventually damage the engine.

The engine valve actuation system and method of the present invention solves one or more of the problems set forth above.

SUMMARY OF THE INVENTION

One aspect of the present invention is directed to an engine valve actuation system that includes an engine valve moveable between a closed position and an open position. A spring is operatively connected to the engine valve to bias the engine valve towards the closed position. An actuator is operatively connected to the engine valve and is operable to selectively engage the engine valve to prevent the engine valve from returning to the closed position and to release the engine valve to allow the engine valve to return to the closed position. A sensor is configured to provide information related to the operation of the actuator. A controller is configured to transmit a signal to the actuator to engage the engine valve to prevent the engine valve from returning to the closed position and to release the engine valve to the allow the engine valve to return to the closed position. The controller is further configured to receive a signal from said sensor and to identify when the actuator fails to engage the engine valve in response to the transmitted signal or when the actuator fails to release the engine valve.

In another aspect, the present invention is directed to a method of controlling an engine valve. A cam assembly is operated to move an engine valve between a closed position and an open position. A signal is transmitted to engage an actuator with the engine valve when the engine valve is at least partially open to prevent the engine valve from returning to the closed position and to release the engine valve to allow the engine valve to return to the closed position. An identification is made when the actuator fails to engage the engine valve in response to the transmitted signal or when the actuator fails to release the engine valve.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
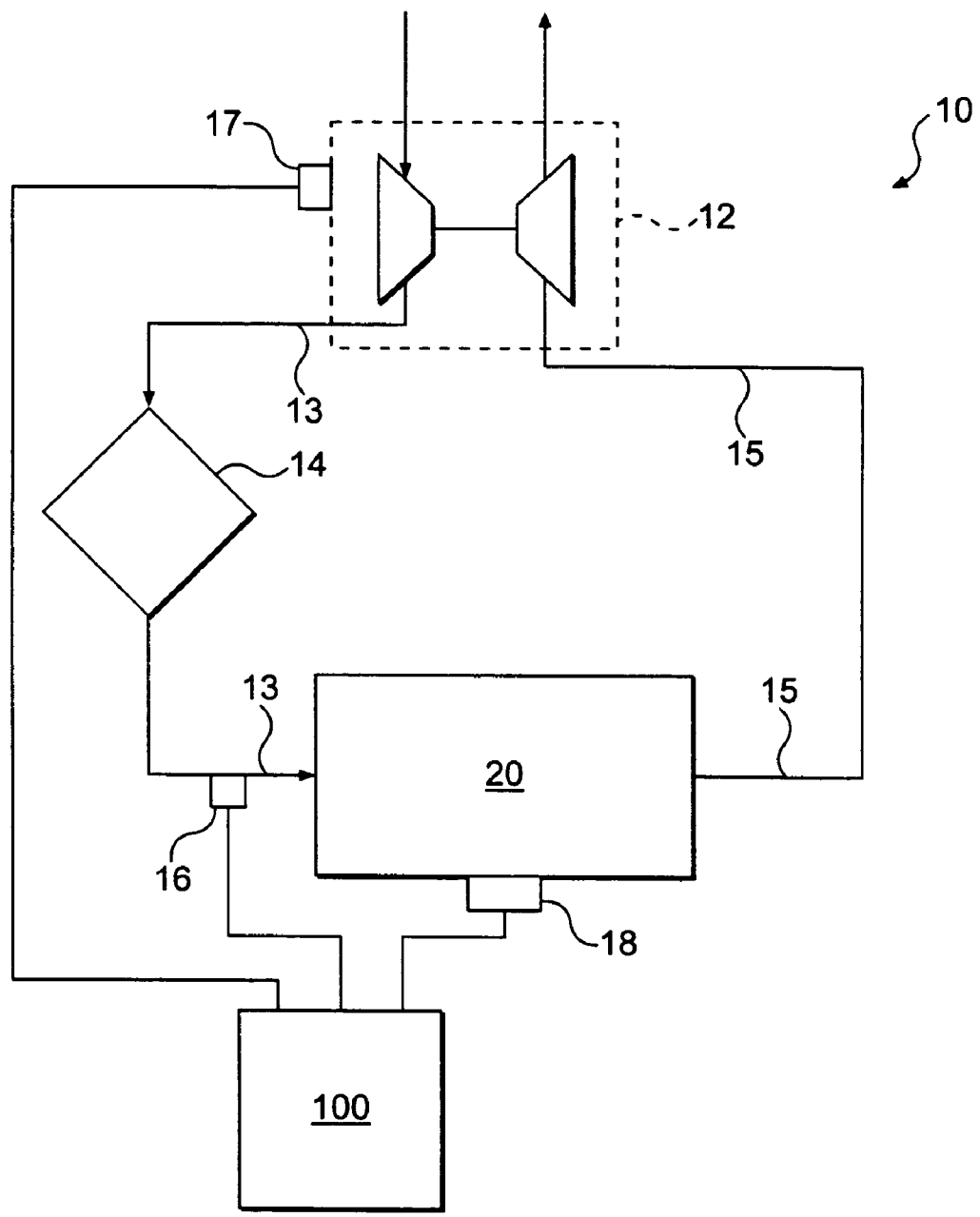
FIG. 1 is a diagrammatic and schematic representation of an engine system in accordance with an exemplary embodiment of the present invention.

An exemplary embodiment of an engine system 10 is illustrated in FIG. 1. Engine system 10 includes an intake air passageway 13 that leads to an engine 20. One skilled in the art will recognize that engine system 10 may include various components, such as, for example, a turbocharger 12 and an aftercooler 14, that are disposed in intake air passageway 13. An exhaust air passageway 15 may lead from engine 20 to turbocharger 12.

Figure 2:
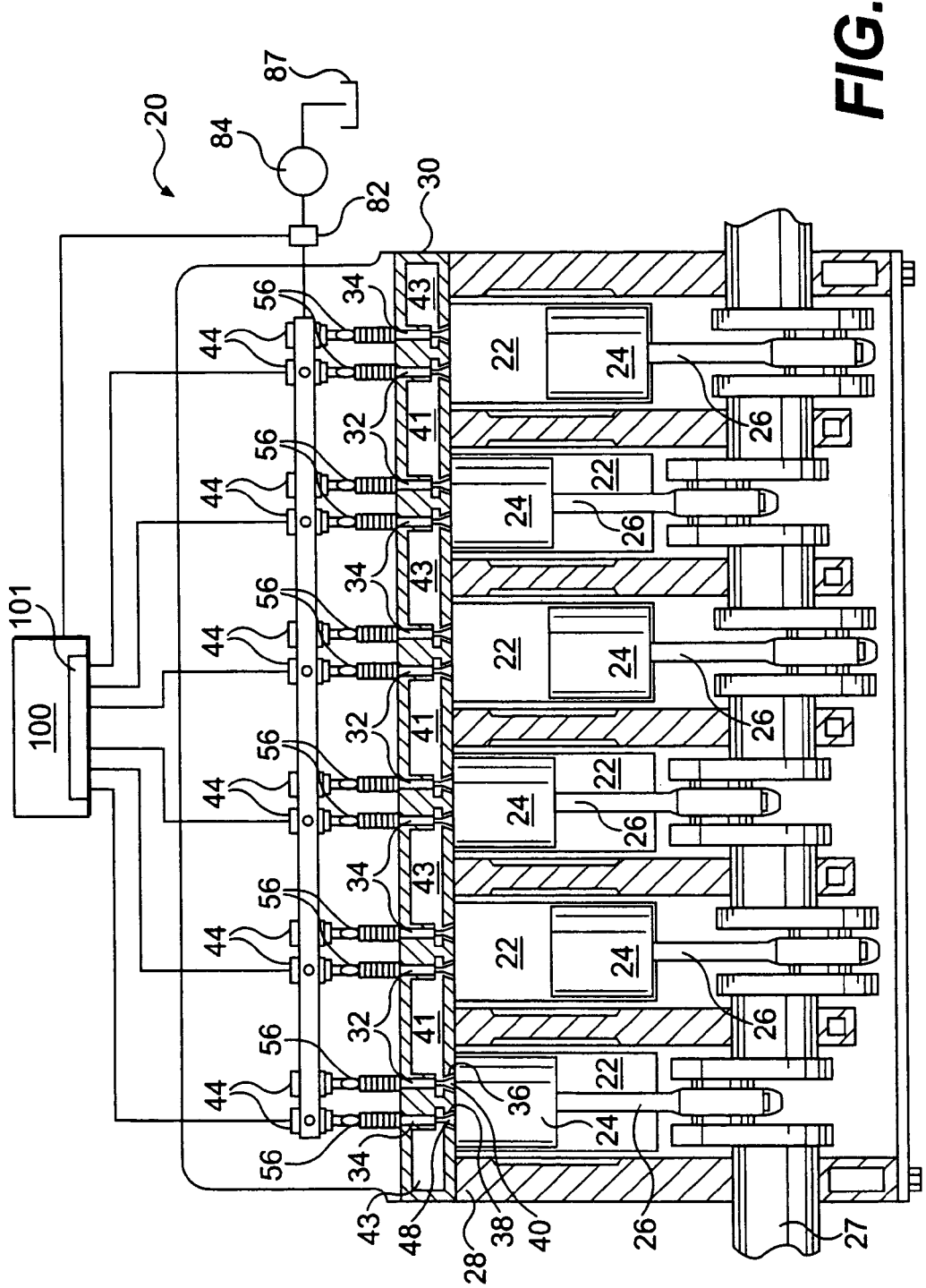
FIG. 2 is a diagrammatic cross-sectional view of an internal combustion engine in accordance with an exemplary embodiment of the present invention.

Engine 20 may be an internal combustion engine as illustrated in FIG. 2. For the purposes of the present disclosure, engine 20 is depicted and described as a four stroke diesel engine. One skilled in the art will recognize, however, that engine 20 may be any other type of internal combustion engine, such as, for example, a gasoline or natural gas engine.

As illustrated in FIG. 2, engine 20 includes an engine block 28 that defines a plurality of cylinders 22. A piston 24 is slidably disposed within each cylinder 22. In the illustrated embodiment, engine 20 includes six cylinders 22 and six associated pistons 24. One skilled in the art will readily recognize that engine 20 may include a greater or lesser number of pistons 24 and that pistons 24 may be disposed in an "in-line" or "V" type configuration.

As also shown in FIG. 2, engine 20 includes a crankshaft 27 that is rotatably disposed within engine block 28. A connecting rod 26 connects each piston 24 to crankshaft 27. Each piston 24 is coupled to crankshaft 27 so that a sliding motion of piston 24 within the respective cylinder 22 results in a rotation of crankshaft 27. Similarly, a rotation of crankshaft 27 will cause a sliding motion of piston 24.

Engine 20 also includes a cylinder head 30. Cylinder head 30 defines an intake passageway 41 that leads to at least one intake port 36 for each cylinder 22. Cylinder head 30 may further define two or more intake ports 36 for each cylinder 22.

An intake valve 32 is disposed within each intake port 36. Intake valve 32 includes a valve element 40 that is configured to selectively block intake port 36. As described in greater detail below, each intake valve 32 may be actuated to lift valve element 40 to thereby open the respective intake port 36. The intake valves 32 for each cylinder 22 may be actuated in unison or independently.

Cylinder head 30 also defines at least one exhaust port 38 for each cylinder 22. Each exhaust port 38 leads from the respective cylinder 22 to an exhaust passageway 43. Cylinder head 30 may further define two or more exhaust ports 38 for each cylinder 22.

An exhaust valve 34 is disposed within each exhaust port 38. Exhaust valve 34 includes a valve element 48 that is configured to selectively block exhaust port 38. As described in greater detail below, each exhaust valve 34 may be actuated to lift valve element 48 to thereby open the respective exhaust port 38. The exhaust valves 34 for each cylinder 22 may be actuated in unison or independently.

Figure 3:
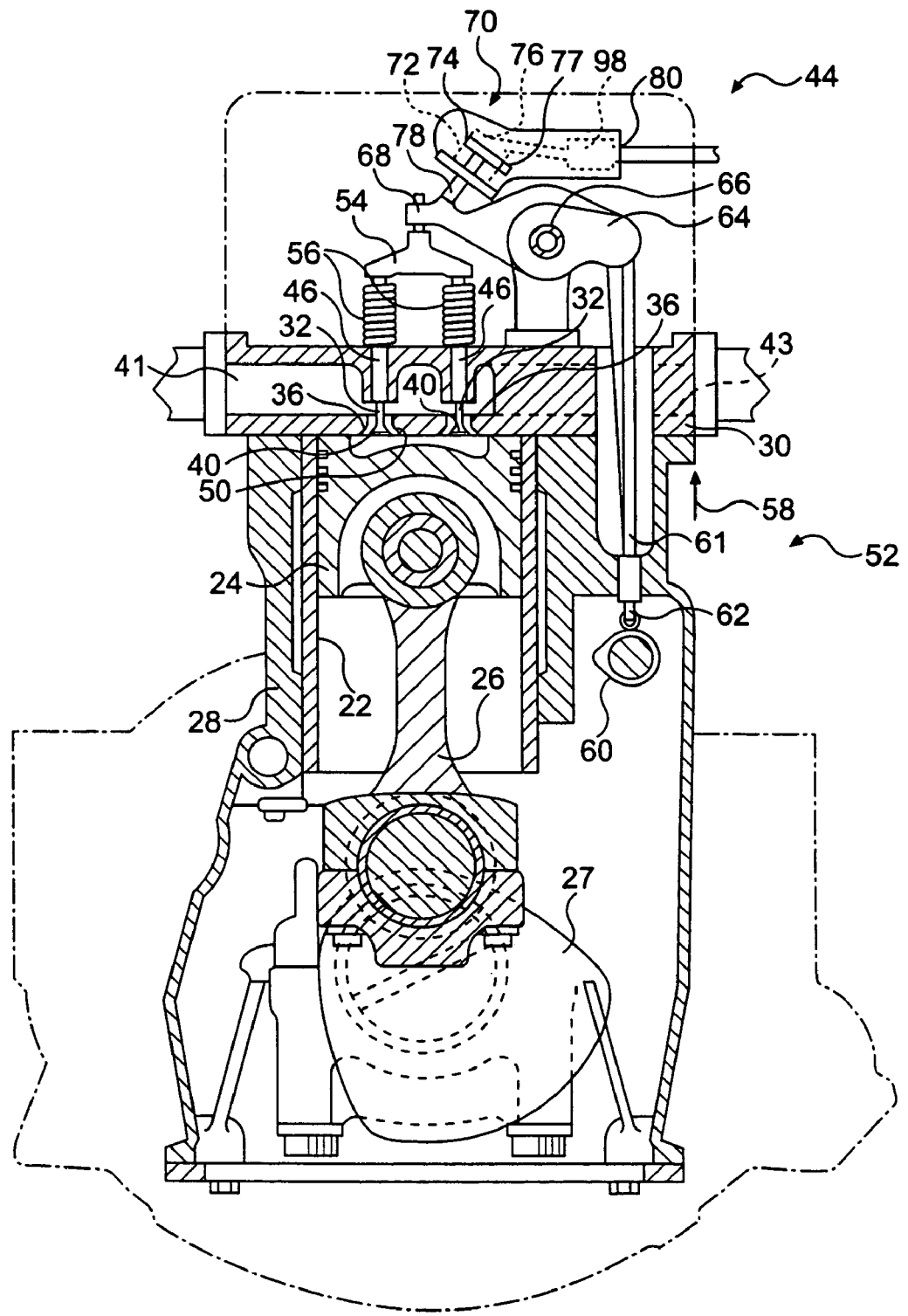
FIG. 3 is a diagrammatic cross-sectional view of a cylinder and valve actuation assembly in accordance with an exemplary embodiment of the present invention.

FIG. 3 illustrates an exemplary embodiment of one cylinder 22 of engine 20. As shown, cylinder head 30 defines a pair of intake ports 36 connecting intake passageway 41 to cylinder 22. Each intake port 36 includes a valve seat 50. One intake valve 32 is disposed within each intake port 36. Valve element 40 of intake valve 32 is configured to engage valve seat 50. When intake valve 32 is in a closed position, valve element 40 engages valve seat 50 to close intake port 36 and blocks fluid flow relative to cylinder 22. When intake valve 32 is lifted from the closed position, intake valve 32 allows a flow of fluid relative to cylinder 22.

Similarly, cylinder head 30 may define two or more exhaust ports 38 (only one of which is illustrated in FIG. 2) that connect cylinder 22 with exhaust passageway 43. One exhaust valve 34 is disposed within each exhaust port 38. A valve element 48 of each exhaust valve 34 is configured to close exhaust port 38 when exhaust valve 34 is in a closed position and block fluid flow relative to cylinder 22. When exhaust valve 34 is lifted from the closed position, exhaust valve 32 allows a flow of fluid relative to cylinder 22.

As also shown in FIG. 2, a series of valve actuation assemblies 44 are operatively associated with each intake valve 32 and exhaust valve 34. Each valve actuation assembly 44 is operable to open or "lift" the associated intake valve 32 or exhaust valve 34. In the following exemplary description, valve actuation assembly 44 is driven by a combination of a cam assembly 52 and a fluid actuator 70. One skilled in the art will recognize, however, that valve actuation assembly 44 may be driven by through other types of systems, such as, for example, a hydraulic actuation system, an electronic solenoid system, or any combination thereof.

In the exemplary embodiment of FIG. 3, valve actuation assembly 44 includes a bridge 54 that is connected to each valve element 40 through a pair of valve stems 46. A spring 56 may be disposed around each valve stem 46 between cylinder head 30 and bridge 54. Spring 56 acts to bias both valve elements 40 into engagement with the respective valve seat 50 to thereby close each intake port 36.

Valve actuation assembly 44 also includes a rocker arm 64. Rocker arm 64 is configured to pivot about a pivot 66. One end 68 of rocker arm 64 is connected to bridge 54. The opposite end of rocker arm 64 is connected to a cam assembly 52. In the exemplary embodiment of FIG. 3, cam assembly 52 includes a cam 60 having a cam lobe and mounted on a cam shaft, a push rod 61, and a cam follower 62. One skilled in the art will recognize that cam assembly 52 may have other configurations, such as, for example, where cam 60 acts directly on rocker arm 64.

Valve actuation assembly 44 may be driven by cam 60. Cam 60 is connected to crankshaft 27 so that a rotation of crankshaft 27 induces a corresponding rotation of cam 60. Cam 60 may be connected to crankshaft 27 through any means readily apparent to one skilled in the art, such as, for example, through a gear reduction assembly (not shown). As one skilled in the art will recognize, a rotation of cam 60 will cause cam follower 62 and associated push rod 61 to periodically reciprocate between an upper and a lower position.

The reciprocating movement of push rod 61 causes rocker arm 64 to pivot about pivot 66. When push rod 61 moves in the direction indicated by arrow 58, rocker arm 64 will pivot and move bridge 54 in the opposite direction. The movement of bridge 54 causes each intake valve 32 to lift and open intake ports 36. As cam 60 continues to rotate, springs 56 will act on bridge 54 to return each intake valve 32 to the closed position.

In this manner, the shape and orientation of cam 60 controls the timing of the actuation of intake valves 32. As one skilled in the art will recognize, cam 60 may be configured to coordinate the actuation of intake valves 32 with the movement of piston 24. For example, intake valves 32 may be actuated to open intake ports 36 when piston 24 is withdrawing within cylinder 22 to allow air to flow from intake passageway 41 into cylinder 22.

A similar valve actuation assembly 44 may be connected to exhaust valves 34. A second cam (not shown) may be connected to crankshaft 27 to control the actuation timing of exhaust valves 34. Exhaust valves 34 may be actuated to open exhaust ports 38 when piston 24 is advancing within cylinder 22 to allow exhaust to flow from cylinder 22 into exhaust passageway 43.

As shown in FIG. 3, valve actuation assembly 44 also includes a fluid actuator 70. Fluid actuator 70 includes an actuator cylinder 72 that defines an actuator chamber 76. An actuator piston 74 is slidably disposed within actuator cylinder 72 and is connected to an actuator rod 78. A return spring (not shown) may act on actuator piston 74 to return actuator piston 74 to a home position. Actuator rod 78 is engageable with an end 68 of rocker arm 64.

A fluid line 80 is connected to actuator chamber 76. Pressurized fluid may be directed through fluid line 80 into actuator chamber 76 to move actuator piston 74 within actuator cylinder 72. Movement of actuator piston 74 causes actuator rod 78 to engage end 68 of rocker arm 64. Fluid may be introduced to actuator chamber 76 when intake valves 32 are in the open position to move actuator rod 78 into engagement with rocker arm 64 to thereby hold intake valves 32 in the open position. Alternatively, fluid may be introduced to actuator chamber 76 when intake valves 32 are in the closed position to move actuator rod 78 into engagement with rocker arm 64 and pivot rocker arm 64 about pivot 66 to thereby open intake valves 32.

Figure 4:
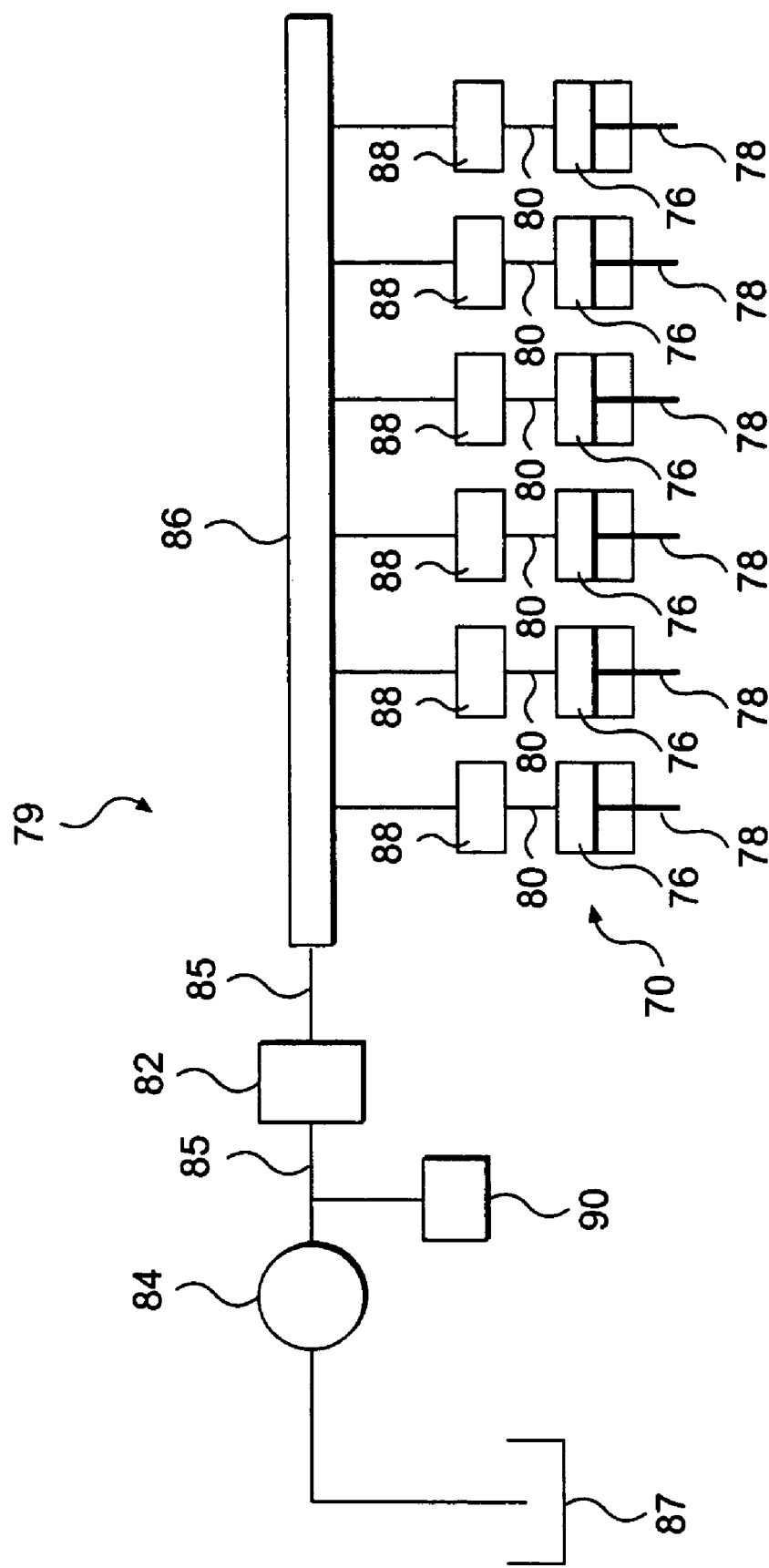
FIG. 4 is a schematic and diagrammatic representation of a fluid supply system for a fluid actuator for an engine valve in accordance with an exemplary embodiment of the present invention.

As illustrated in FIGS. 2 and 4, a source of hydraulic fluid 84 is provided to draw fluid from a tank 87 and to supply pressurized fluid to fluid actuator 70. Source of hydraulic fluid 84 may be part of a lubrication system, such as typically accompanies an internal combustion engine. Such a lubrication system may provide pressurized fluid having a pressure of, for example, less than 700 KPa (100 psi) or, more particularly, between about 210 KPa and 620 KPa (30 psi and 90 psi). Alternatively, the source of hydraulic fluid may be a pump configured to provide fluid at a higher pressure, such as, for example, between about 10 MPa and 35 MPa (1450 psi and 5000 psi).

A fluid supply system 79 connects source of hydraulic fluid 84 with fluid actuator 70. In the exemplary embodiment of FIG. 4, source of hydraulic fluid 84 is connected to a fluid rail 86 through fluid line 85. A control valve 82 is disposed in fluid line 85. Control valve 82 may be opened to allow pressurized fluid to flow from source of hydraulic fluid 84 to fluid rail 86. Control valve 82 may be closed to prevent pressurized fluid from flowing from source of hydraulic fluid 84 to fluid rail 86.

As illustrated in FIG. 4, fluid rail 86 supplies pressurized fluid from source of hydraulic fluid 84 to a series of fluid actuators 70. Each fluid actuator 70 may be associated with either the intake valves 32 or the exhaust valves 34 of a particular engine cylinder 22 (referring to FIG. 2). Fluid lines 80 direct pressurized fluid from fluid rail 86 into the actuator chamber 76 of each fluid actuator 70.

A directional control valve 88 may be disposed in each fluid line 80. Each directional control valve 88 may be opened to allow pressurized fluid to flow between fluid rail 86 and actuator chamber 76. Each directional control valve 88 may be closed to prevent pressurized fluid from flowing between fluid rail 86 and actuator chamber 76. Directional control valve 88 may be normally biased into a closed position and actuated to allow fluid to flow through directional control valve 88. Alternatively, directional control valve 88 may be normally biased into an open position and actuated to prevent fluid from flowing through directional control valve 88. One skilled in the art will recognize that directional control valve 88 may be any type of controllable valve, such as, for example a two coil latching valve.

One skilled in the art will recognize that fluid supply system 79 may have a variety of different configurations and include a variety of different components. For example, fluid supply system 79 may include a check valve (not shown) placed in parallel with directional control valve 88 between control valve 82 and fluid actuator 70. In addition, fluid supply system 79 may include a source of high pressure fluid. Fluid supply system 79 may also include a snubbing valve to control the rate of fluid flow from fluid actuator 70 and a damping system, which may include an accumulator and a restricted orifice, to prevent pressure oscillations in actuator chamber 76 and fluid line 80.

As shown in FIGS. 1 and 2, engine system 10 includes a controller 100. Controller 100 is connected to each valve actuation assembly 44 and to control valve 82. Controller 100 may include an electronic control module that has a microprocessor and a memory. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

Controller 100 may be programmed to control one or more aspects of the operation of engine 20. For example, controller 100 may be programmed to control valve actuation assembly 44, the fuel injection system, and any other engine function commonly controlled by an electronic control module. Controller 100 may control engine 20 based on the current operating conditions of the engine and/or instructions received from an operator.

Figure 5:
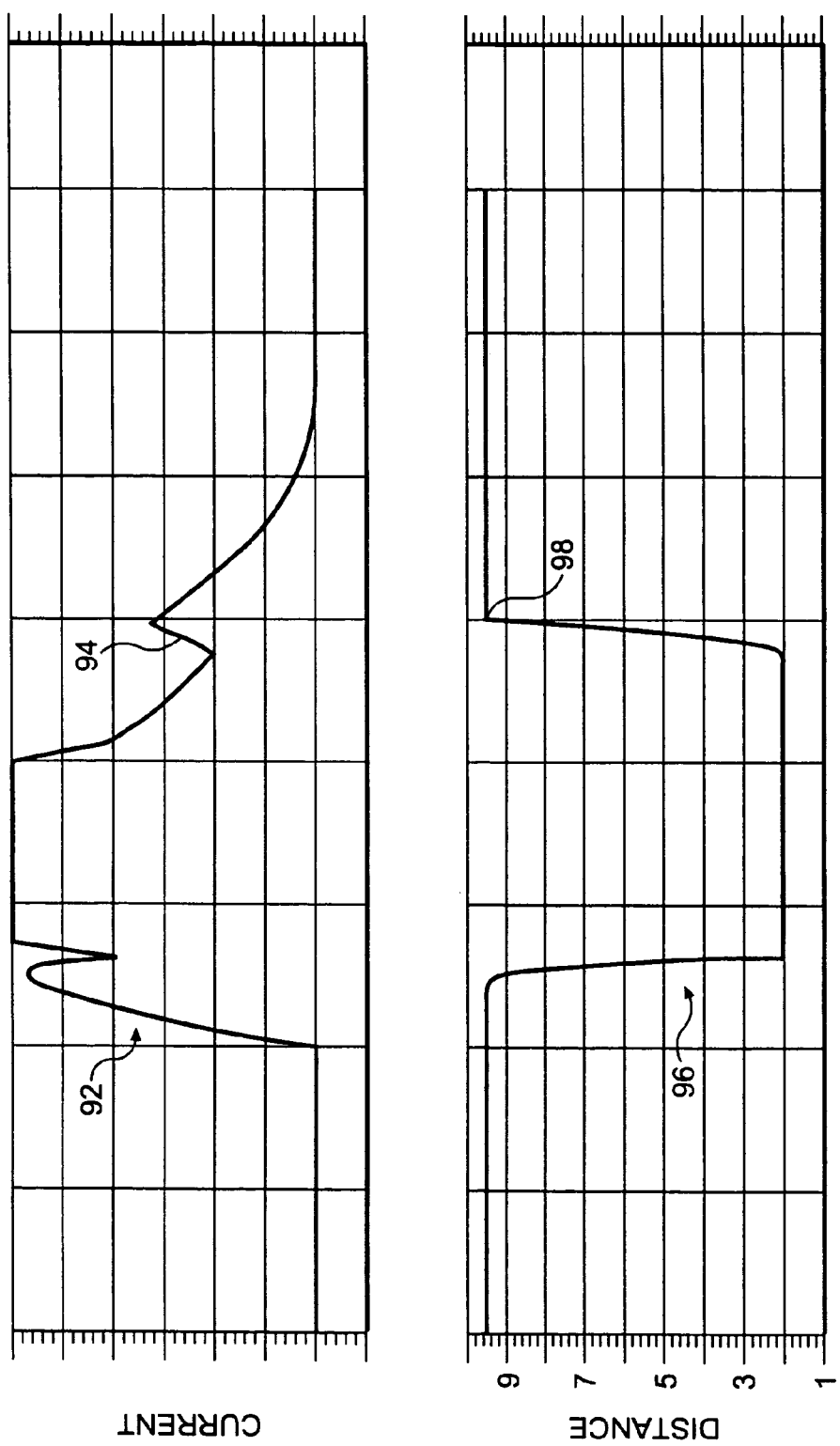
FIG. 5 is a graphic illustration of an exemplary relationship between a current applied to a valve and the resulting displacement of the valve.

Controller 100 may control valve actuation assembly 44 by transmitting a signal, such as, for example, a current, to directional control valve 88. The transmitted signal may result in the selective opening and closing of directional control valve 88. If directional control valve 88 is a normally closed valve, the transmitted signal may open the valve to allow hydraulic fluid to flow to and/or from fluid actuator 70. If directional control valve 88 is a normally opened valve, the transmitted signal may close the valve to prevent fluid from flowing to and/or from fluid actuator 70. An exemplary signal 92 is illustrated in FIG. 5. As shown, signal 92 may be a current that causes a displacement 96 in directional control valve 88. One skilled in the art will recognize that type and form of the signal transmitted to directional control valve 88 will depend upon the operating characteristics of the particular directional control valve 88.

As illustrated in FIGS. 1–4, a series of sensors, which are described in greater detail below, may be operatively engaged with engine 20 and/or valve actuation assemblies 44. Each sensor is configured to monitor a particular parameter of the performance of engine 20 or valve actuation assemblies 44. One skilled in the art may recognize that alternative sensors may be used with engine system 10 to monitor the performance of engine 20 or valve actuation assemblies 44.

As illustrated in FIG. 2, controller 100 may include a current sensor 101. Current sensor 101 is configured to monitor the current applied to directional control valve 88. Current sensor 101 may be any type of sensor readily apparent to one skilled in the art as capable of sensing the magnitude of a current. Alternatively, controller 100 may include a sensor configured to monitor the voltage, resistance, inductance, or continuity of a signal applied to directional control valve 88. It should be understood that current sensor 101 may be part of controller 100 or current sensor 101 may be a separate sensor positioned at any appropriate location.

As also shown in FIG. 1, at least one engine sensor 18 is operatively connected with engine 20. Engine sensor 18 may be any type of sensor commonly used to monitor engine performance. For example, engine sensor 18 may be configured to measure one or more of the following: a rotational speed of the engine, a delivered torque of the engine, a temperature of the engine, a pressure within one or more of cylinders 22, and a rotational angle of crankshaft 27.

As further shown in FIG. 1, an intake sensor 16 may be disposed in intake passageway 13. Intake sensor 16 may be configured to sense the pressure of the intake air and/or the mass flow rate of the intake air. Intake sensor 16 may be any type of sensor readily apparent to one skilled in the art as capable of sensing these types of parameters and may be disposed at any point along intake passageway 13.

As further shown in FIG. 1, a turbocharger sensor 17 may be operatively connected with turbocharger 12. Turbocharger sensor 17 may be configured to sense the speed of the turbocharger. Turbocharger sensor 17 may also be configured to any other operational parameter of turbocharger 12.

As shown in FIG. 3, an actuator sensor 77 may be positioned proximate fluid actuator 70. Actuator sensor 77 may be configured to monitor fluid actuator 70 to detect movement. For example, actuator sensor 77 may be a magnetic sensor, such as, for example, a LVDT sensor, that senses movement of one or both of actuator rod 78 or actuator piston 74. One skilled in the art may recognize that other types of sensors may be used to detect movement of fluid actuator 70.

As illustrated in FIG. 4, a fluid sensor 90 may be operatively engaged with fluid supply system 79. Fluid sensor 90 may be configured to sense the pressure and/or temperature of the hydraulic fluid supplied to fluid actuator 70. Fluid sensor 90 may be operatively engaged with fluid supply system 79 at any point within fluid supply system 79. For example, fluid sensor 90 may be disposed in actuator chamber 72, fluid line 80, or fluid rail 86.

Industrial Applicability

Controller 100 may operate each valve actuation assembly 44 to selectively implement a late intake Miller cycle for each cylinder 22 of engine 20. Under normal operating conditions, implementation of the late intake Miller cycle will increase the overall efficiency of the engine 20. Under some operating conditions, such as, for example, when engine 20 is cold, controller 100 may operate engine 20 on a conventional diesel cycle.

When engine 20 is operating under normal operating conditions, controller 100 implements a late intake Miller cycle by selectively actuating fluid actuator 70 to hold intake valve 32 open for a first portion of the compression stroke of piston 24. This may be accomplished by transmitting a signal to move control valve 82 and directional control valve 88 to the open positions when piston 24 starts an intake stroke. This allows pressurized fluid to flow from source of hydraulic fluid 84 through fluid rail 86 and into actuator chamber 76. The force of the fluid entering actuator chamber 76 moves actuator piston 74 so that actuator rod 78 follows end 68 of rocker arm 64 as rocker arm 64 pivots to open intake valves 32. The distance and rate of movement of actuator rod 78 will depend upon the configuration of actuator chamber 76 and fluid supply system 79. When actuator chamber 76 is filled with fluid and rocker arm 64 returns intake valves 32 from the open position to the closed position, actuator rod 78 will engage end 68 of rocker arm 64.

When actuator chamber 76 is filled with fluid, directional control valve 88 may be closed. This prevents fluid from escaping from actuator chamber 76. As cam 60 continues to rotate and springs 56 urge intake valves 32 towards the closed position, actuator rod 78 will engage end 68 of rocker arm and prevent intake valves 32 from closing. As long as directional control valve 88 remains in the closed position, the trapped fluid in actuator chamber 76 will prevent springs 56 from returning intake valves 32 to the closed position. Thus, fluid actuator 70 will hold intake valves 32 in the open position, independently of the action of cam assembly 52.

Controller 100 may close intake valves 32 by opening directional control valve 88. This allows the pressurized fluid to flow out of actuator chamber 76. The force of springs 56 forces the fluid from actuator chamber 76, thereby allowing actuator piston 74 to move within actuator cylinder 72. This allows rocker arm 64 to pivot so that intake valves 32 are moved to the closed position. A snubbing valve may restrict the rate at which fluid exits actuator chamber 76 to reduce the velocity at which intake valves 32 are closed. This may prevent valve elements 40 from being damaged when closing intake ports 36.

When engine 20 is operating in a conventional diesel cycle, a greater compression ratio will be experienced within each cylinder 22. A prolonged exposure to this increased pressure condition may damage engine 20. This damage may be avoided by identifying a condition where fluid actuator 70 is not properly functioning to implement the late intake Miller cycle.

Controller 100 is programmed to monitor at least one parameter that is affected by the operation of fluid actuator 70. Controller 100 analyzes the information provided by the sensors to identify a situation where the engine should be operating on a Miller cycle, but is actually operating on a conventional diesel cycle. This situation may be experienced due to a failure in valve actuation assembly 44. When such a situation is identified, controller 100 may provide an indication, such as, for example, illuminating a warning light, that prompt maintenance is required. Controller 100 may also terminate future fuel injections to the particular cylinder.

Controller 100 may identify this situation through a variety of techniques, examples of which are described in greater detail below. It should be understood, however, that many combinations, variations, and alternatives to the described techniques may be apparent to one skilled in the art and are considered to be within the scope of the present invention.

For example, controller 100 may monitor the current applied to directional control valve 88 through current sensor 101. As shown in FIG. 5, a current inflection 94 is experienced when directional control valve 88 reaches a closed position 98. The current inflection 94 is caused by a change in the resistance and/or inductance of directional control valve 88 when the valve reaches the closed position. If controller 100 transmits a signal to directional control valve 88 to either open or close the valve and no current inflection 94 is detected, controller 100 may identify this condition as a possible failure of directional control valve 88. A failure of the directional control valve 88 may translate to a failure of fluid actuator 70. If fluid actuator 70 is not functioning properly, a Miller cycle may not be implemented. Accordingly, controller should issue a warning that maintenance may be required and/or terminate future fuel injections to the particular cylinder 22.

Controller 100 may also monitor one or more engine parameters through engine sensor 18. For example, controller 100 may monitor the rotational speed of crankshaft 27, the torque exerted by engine 20, and/or the pressure within one or more cylinders 22. An increase in one or more of these parameters may indicate that engine 20 is operating in a conventional diesel cycle. If controller 100 senses an unexpected increase in one of these parameters when engine 20 should be operating in a Miller cycle, controller 100 should issue a warning that maintenance may be required and/or terminate future fuel injections to the particular cylinder 22.

Controller 100 may also monitor and analyze a combination of engine parameters to identify when the Miller cycle is not implemented. For example, controller 100 may monitor the pressure within cylinder 22 as a function of the crankshaft 27 angle and/or piston 24 position. Controller 100 may also determine an estimated cylinder pressure as a function of piston position for the current engine operating conditions. Controller 100 may compare the monitored cylinder pressure to the predicted cylinder pressure at different piston positions. A significant difference between the predicted cylinder pressure and the monitored cylinder pressure may indicate that valve actuator 70 is not functioning properly. A situation where the monitored cylinder pressure is significantly greater than the predicted cylinder pressure may be indicative of valve actuator 70 failing to implement the Miller cycle. Alternatively, a situation where the monitored cylinder pressure is significantly less than the predicted cylinder pressure may be indicative of valve actuator 70 failing to release intake valve 32. The failure of valve actuator 70 to release intake valve 32 may lead to inadequate compression ratios for auto ignition and/or to an increase in unburned hydrocarbons being dumped to the environment. Accordingly, if controller 100 detects either situation, controller 100 may issue a warning that maintenance is required and/or terminate future fuel injections to the particular chamber 22.

Controller 100 may also monitor the motion of actuator rod 78 and/or actuator piston 74. When engine 20 is operating in a Miller cycle, hydraulic fluid will enter actuator chamber 72 to move actuator piston 74 and actuator rod 78. Accordingly, if engine 20 should be operating in a Miller cycle and controller 100 does not detect motion of either actuator piston 74 or actuator rod 78, controller 100 should issue a warning that maintenance may be required and/or terminate future fuel injections to the particular cylinder 22.

Controller 100 may also monitor the pressure of the hydraulic fluid within actuator chamber 72 or within fluid system 79 through fluid sensor 90. When engine 20 is operating in a Miller cycle, the pressure of fluid within actuator chamber 72 will increase when actuator rod 78 engages end 68 of rocker arm 64. The pressure of the hydraulic fluid within fluid supply system 79 will periodically fluctuate as hydraulic fluid flows into and out of actuator chamber 72. Accordingly, if engine 20 should be operating in a Miller cycle and controller 100 determines that the pressure within actuator chamber 72 and/or fluid supply system 79 remains constant, controller 100 should issue a warning that maintenance may be required and/or terminate future fuel injections to the particular cylinder 22.

Controller 100 may also monitor the flow of intake air into engine 20 through intake sensor 16. An unexpected increase in either the intake air pressure or the intake air mass flow may indicate that engine 20 has switched from the Miller cycle to a conventional diesel cycle. Accordingly, if engine 20 should be operating on the Miller cycle and controller 100 identifies an unexpected increase in either the intake air pressure of the intake air mass flow rate, controller 100 should issue a warning that maintenance may be required and/or terminate future fuel injections to the particular cylinder 22.

Controller 100 may also monitor the performance of turbocharger 12 through turbocharger sensor 17. An unexpected increase in the speed of turbocharger 12 may indicate that engine 20 has switched from the Miller cycle to a conventional diesel cycle. Accordingly, if engine 20 should be operating on the Miller cycle and controller 100 identifies an unexpected increase in the speed of turbocharger 12, controller 100 should issue a warning that maintenance may be required. Controller 100 may also take corrective action to prevent damage to engine 20. For example, controller 100 may reduce the amount of fuel delivered to each cylinder 22. In addition, controller 100 may modify the performance of turbocharger to reduce the pressure of the intake air. For example, controller 100 may adjust the position of a wastegate.

As will be apparent from the foregoing description, the present invention provides a method and system for identifying a potential problem in an engine valve actuation system. The controller may identify a condition where the engine should be operating in a Miller cycle, but the performance characteristics of the engine indicate that the engine is actually operating in a conventional diesel cycle. When this condition is identified, the controller may issue a warning indicating that the engine valve actuation system requires maintenance to prevent further damage to the engine. The controller may also take corrective action such as stopping fuel delivery or reducing the quantity of fuel delivered to one or all of the combustion cylinders or actuating a wastegate or similar device to reduce pressure of air delivered to the combustion chamber.

It will be apparent to those skilled in the art that various modifications and variations can be made in the engine valve actuation system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. An engine valve actuation system, comprising:
   an engine valve moveable between a closed position and an open position;
   a cam configured to move the engine valve between the closed position and the open position;
   a spring operatively connected to the engine valve to bias the engine valve towards the closed position;
   an actuator operatively connected to the engine valve, the actuator operable to selectively engage the engine valve to prevent the engine valve from returning to the closed position and to release the engine valve to allow the engine valve to return to the closed position;
   a sensor configured to provide information related to the operation of the actuator; and
   a controller configured to transmit a signal to the actuator to engage the engine valve to prevent the engine valve from returning to the closed position and to release the engine valve to allow the engine valve to return to the closed position, the controller further configured to receive a signal from said sensor and to identify when the actuator fails to engage the engine valve in response to the transmitted signal or when the actuator fails to release the engine valve.

2. The system of claim 1, wherein the sensor provides information related to at least one of a current applied to a directional control valve, a voltage applied to the directional control valve, the resistance of the signal transmitted to the directional control valve, the inductance of the signal transmitted to the directional control valve, the continuity of the signal transmitted to the directional control valve, an engine speed, an engine torque, a motion of the actuator, a pressure in a cylinder, an actuator fluid pressure, an intake air pressure, an intake air flow rate, and a turbocharger speed.

3. The system of claim 1, wherein the information relates to a operating condition of the engine.

4. The system of claim 1, wherein the information relates to a status of the actuator.

5. The system of claim 1, further including:
   a source of hydraulic fluid in fluid communication with the actuator; and
   a directional control valve disposed between the source of hydraulic fluid and the actuator and moveable between an open position to allow a flow of hydraulic fluid from the source of hydraulic fluid to the actuator and a closed position to prevent the flow of fluid between the source of hydraulic fluid and the actuator.

6. The system of claim 5, wherein the actuator engages the engine valve to prevent the engine valve from returning to the closed position in response to the controller moving the directional control valve to the closed position.

7. The system of claim 6, wherein the sensor is disposed in operative connection with the source of hydraulic fluid.

8. A method of controlling an engine valve, comprising:
   operating a cam assembly to move an engine valve between a closed position and an open position;
   transmitting a signal to engage an actuator with the engine valve when the engine valve is at least partially open to prevent the engine valve from returning to the closed position and to release the engine valve to allow the engine valve to return to the closed position; and
   identifying when the actuator fails to engage the engine valve in response to the transmitted signal or when the actuator fails to release the engine valve.

9. The method of claim 8, wherein the engine valve is an intake valve and the actuator prevents the intake valve from closing until a piston completes at least a portion of a compression stroke.

10. The method of claim 8, wherein the signal is transmitted to a directional control valve that controls a flow of fluid to and from the actuator.

11. The method of claim 10, wherein the signal is a current and the current is monitored to identify an inflection in the current.

12. The method of claim 10, further including closing the directional control valve to engage the actuator with the engine valve and opening the directional control valve to allow the engine valve to close.

13. The method of claim 8, further including sensing at least one operating condition indicative of the condition where the engine valve fails to respond to the transmitted signal.

14. The method of claim 13, further including sensing at least one of an engine speed, an engine torque, a motion of the actuator, a pressure in a cylinder, an actuator fluid pressure, an intake air pressure, an intake air flow rate, and a turbocharger speed.

15. The method of claim 13, further including terminating fueling to a cylinder when the actuator fails to engage or release the engine valve.

16. An engine, comprising,
   an engine block defining at least one cylinder;
   at least one piston slidably disposed within the at least one cylinder;
   at least one intake valve operatively associated with the at least one cylinder;
   a cam assembly operatively connected to the at least one intake valve to move the intake valve between a closed position and an open position;
   an actuator operatively connected to the engine valve, the actuator configured to selectively engage the engine valve to prevent the engine valve from returning to the closed position and to release the engine valve to allow the engine valve to return to the closed position; and
   a controller configured to transmit a signal to the actuator to engage the engine valve to prevent the engine valve from returning to the closed position and to release the engine valve to the allow the engine valve to return to the closed position, the controller further configured to identify when the actuator fails to engage the engine valve in response to the transmitted signal or when the actuator fails to release the engine valve.

17. The engine of claim 16, further including at least one sensor configured to sense at least one of an engine speed, a motion of the actuator, a pressure in a cylinder, an actuator fluid pressure, an intake air pressure, an intake air flow rate, and a turbocharger speed.

18. The engine of claim 17, further including:
   a source of hydraulic fluid in fluid communication with the fluid actuator; and
   a directional control valve disposed between the source of hydraulic fluid and the actuator and moveable between an open position to allow a flow of hydraulic fluid from the source of hydraulic fluid to the actuator and a closed position to prevent the flow of fluid between the source of hydraulic fluid and the actuator.

19. The engine of claim 18, wherein the directional control valve is moveable between an open position to allow a flow of hydraulic fluid to or from the actuator and a closed position to prevent a flow of fluid to or from the actuator.

20. The engine of claim 19, wherein the actuator engages the engine valve to prevent the engine valve from returning to the closed position in response to the controller moving the directional control valve to the closed position.

21. The engine of claim 16, further including a turbocharger configured to provide charged air to the at least one cylinder.

22. The engine of claim 16, further including a cooler configured to reduce the temperature of the charged air provided by the turbocharger.

23. A method of controlling an engine valve, comprising:
operating a cam assembly to move an engine valve between a closed position and an open position;
transmitting a signal to engage an actuator with the engine valve to alter movement of the valve with respect to said cam assembly;
monitoring a parameter that is affected by the operation of the actuator; and
generating a warning signal when the monitored parameter is indicative of a failure of the actuator to engage the engine valve.

24. The method of claim 23, further including monitoring an operating condition of the engine.

25. The method of claim 23, further including monitoring a status of the actuator.

26. The method of claim 23, wherein the monitored parameter is at least one of an engine speed, an engine torque, a motion of the actuator, a pressure in a cylinder, an actuator fluid pressure, an intake air pressure, an intake air flow rate, and a turbocharger speed.

* * * * *